United States Patent
Greulich et al.

(10) Patent No.: US 6,872,775 B2
(45) Date of Patent: Mar. 29, 2005

(54) COMPOUND OF A COMPOSITE BODY

(75) Inventors: Stefan Greulich, Wilmington, DE (US); Karl-Wilhelm Kirberg, Neu-Anspach (DE); Norbert Eickhoff, Bermen (DE); Olaf Stelzer, Schwerin (DE)

(73) Assignees: E.I. du Pont de Nemours and Company, Wilmington, DE (US); Plastolen GmbH, Bremen (DE)

( * ) Notice: Subject to any disclaimer, the term of this patent is extended or adjusted under 35 U.S.C. 154(b) by 8 days.

(21) Appl. No.: 10/047,370

(22) Filed: Jan. 15, 2002

(65) Prior Publication Data

US 2003/0134984 A1 Jul. 17, 2003

(30) Foreign Application Priority Data

Jan. 14, 2002 (EP) ................................ 0110095

(51) Int. Cl.$^7$ .......................... B32B 25/08; B28B 7/22; C08T 7/04; C08L 53/02
(52) U.S. Cl. ................ 525/79; 525/92 A; 525/176; 525/177; 525/184; 525/88; 524/542
(58) Field of Search .................. 525/79, 88, 92 A, 525/176, 177, 184; 524/542

(56) References Cited

U.S. PATENT DOCUMENTS

| | | | |
|---|---|---|---|
| 4,080,356 A | | 3/1978 | Gergen et al. |
| 4,628,072 A | * | 12/1986 | Shiraki et al. ............... 525/57 |
| 6,051,655 A | * | 4/2000 | Nakano et al. ............ 525/240 |
| 6,296,797 B1 | * | 10/2001 | Ziegler et al. ............. 524/542 |

FOREIGN PATENT DOCUMENTS

| | | |
|---|---|---|
| DE | 4434656 C1 | 4/1996 |
| EP | 0863184 A1 | 9/1998 |
| EP | 0837097 B1 | 8/1999 |
| WO | WO 00/20204 | 4/2000 |

* cited by examiner

Primary Examiner—James J. Seidleck
Assistant Examiner—Olga Asinovsky

(57) ABSTRACT

A compound for a composite body having a hard and a soft component, and to a process for producing such a composite body is provided. The compound comprises a hard component (a) of a polyoxymethylene and a soft component (b) of one or more hydrogenated styrene block copolymers, molded directly onto component (a). The styrene block copolymers are from the group of poly-isoprene/butadiene polymer (SEEPS), poly-isoprene polymer (SEPS); polybutadiene polymer (SEBS), and combinations thereof. The styrene block copolymer is adhesion-modified by the addition of a compound selected from styrene/butadiene copolymer (SBS); ethylene/vinyl acetate copolymer (EVA); olefinic polymers, polystyrene (PS), and combinations thereof. One or more of the following substances may also be added as modifiers of the polyoxymethylene: SBS; EVA; hydrogenated styrene block copolymer based on a hydrogenated poly-isoprene/butadiene rubber (SEEPS), hydrogenated styrene block copolymer based on a hydrogenated poly-isoprene rubber (SEPS), hydrogenated styrene block copolymer based on a hydrogenated poly-butadiene rubber (SEBS), compounds based on a hydrogenated styrene block copolymer which can be present as hydrogenated poly-isoprene/butadiene rubber (SEEPS) or as hydrogenated poly-isoprene rubber (SEPS) or as hydrogenated poly-butadiene rubber (SEBS), olefinic polymers; polystyrene; acrylonitrile butadiene styrene (ABS); polycarbonate (PC); styrene acrylonitrile (SAN); and urethane thermoplastic elastomer (TPE-U).

17 Claims, No Drawings

COMPOUND OF A COMPOSITE BODY

BACKGROUND

1. Field of the Invention

The invention relates to a compound having a hard polyoxymethylene component and a soft thermoplastic styrene elastomer component, and to a process for producing a composite body from such compound.

2. Description of the Related Art

Compounds having hard and soft components or composite bodies and the process for producing such compounds or composite bodies are described, for example, in WO 00/20204 and DE 198 45 235. These references require the use of a relatively expensive non-olefinic thermoplastic material, which requires expenditure during compounding, in the form of polyester-urethane elastomers, polyether-urethane elastomers, polyesters, polyamides, polycarbonates or polyacrylates. An improvement in the adhesion between polyoxymethylene (POM) and elastomers of the thermoplastic styrene elastomer (TPE-S) type is said to be achieved by this means. This pairing of materials has also been presented at various technical conferences, such as "Thermoplastic Elastomers" at SKZ Würzburg, May 1999 and Jun. 2000, at which, however, the mechanical properties, the resistance and the bonding adhesion values according to the general state of knowledge were rated as too low for many cases of use. The multicomponent injection molding process has been disclosed for the production of a composite body, and enjoys a constantly increasing demand because the properties of hard and soft materials in one composite body can be combined in one production step.

The combination of POM with TPE-S is of particular interest, because both materials are distinguished by a number of unique properties.

POM is known for: outstanding mechanical properties (high tensile strength, impact strength, rigidity, fatigue resistance); excellent resistance to moisture, motor fuel, lubricants, solvents, neutral chemicals; excellent dimensional accuracy; good electrical insulation properties; creep resistance; low friction; and a broad operating temperature range.

POM is employed in the automotive, domestic appliance, installation, machinery, tool, electronics and consumer goods industries. POM is used for many moving parts, such as gear components, deflection pulleys, toothed wheels or adjusting levers, due to its good sliding friction properties, and is used for snap connections, due to its excellent rebound resilience.

Thermoplastic elastomer (TPE) is known for: widely variable hardness range (Shore A=10 to Shore D=60); low density; good recovery properties; outstanding mechanical properties; high noise-damping; good aging properties and outstanding ozone properties; wide flexibility range and comparatively small change in flexibility in a wide operating temperature range; good resistance to acids and alkalis; and very good static friction.

Thermoplastic styrene elastomer (TPE-S) is used in the same and similar branches of industry as polyoxymethylene (e.g., automotive industry, domestic appliance industry).

In particular, there is therefore a need for a combination of a POM component and one or more TPE-S components, such as hydrogenated styrene block copolymer, in which the adhesion between the two components is greatly improved compared with the prior art so as to make possible the wider use of a combination of POM/TPE-S in multicomponent injection molding, without the need for mechanical anchorings, such as expensive undercuts, being necessary.

SUMMARY OF THE INVENTION

The present invention is directed to a compound for a composite body having a hard and a soft component, and to a process for producing such a composite body. The compound for a composite body of the invention comprises a hard component (a) of a polyoxymethylene and a soft component (b) of one or more hydrogenated styrene block copolymers, molded directly onto component (a). The styrene block copolymers are from the group of poly-isoprene/butadiene polymer (SEEPS), poly-isoprene polymer (SEPS); poly-butadiene polymer (SEBS), and combinations thereof. The styrene block copolymer is adhesion-modified by the addition of compound selected from styrene/butadiene copolymer (SBS); ethylene/vinyl acetate copolymer (EVA); olefinic polymers, polystyrene (PS), and combinations thereof.

According to a preferred embodiment of the invention, one or more of the following substances are added as modifiers of the polyoxymethylene: SBS; EVA; hydrogenated styrene block copolymer based on a hydrogenated poly-isoprene/butadiene rubber (SEEPS), hydrogenated styrene block copolymer based on a hydrogenated poly-isoprene rubber (SEPS), hydrogenated styrene block copolymer based on a hydrogenated poly-butadiene rubber (SEBS), compounds based on a hydrogenated styrene block copolymer which can be present as hydrogenated poly-isoprene/butadiene rubber (SEEPS) or as hydrogenated poly-isoprene rubber (SEPS) or as hydrogenated poly-butadiene rubber (SEBS), olefinic polymers; polystyrene; acrylonitrile butadiene styrene (ABS); polycarbonate (PC); styrene acrylonitrile (SAN); and urethane thermoplastic elastomer (TPE-U).

DETAILED DESCRIPTION

The invention is directed to a compound for a composite body where a combination of the specific properties of the two component materials is desired so as to make possible new uses, such as in fixing clips with a molded-on projecting seal, vehicle construction, fixing elements with a damping function, motor fuel lines, sliding switches with a non-slip touch surface, casings for door locks with a seal injection-molded thereon, and general soft-touch surfaces on POM components with excellent haptic properties.

The TPE-S in the compound according to this invention is based on a hydrogenated styrene block copolymer, which can be present as hydrogenated poly-isoprene/butadiene rubber (SEEPS), as hydrogenated poly-isoprene rubber (SEPS), or as hydrogenated poly-butadiene rubber (SEBS) and includes the following substances which lead to improvement in the adhesion to POM: styrene/butadiene copolymer (SBS); ethylene/vinyl acetate copolymer (EVA); olefinic materials, such as polyethylene (PE) and polypropylene (PP); and/or polystyrene (PS). The use of non-olefinic thermoplastics can happily be omitted.

The modifications can be made to the compound individually or also in combination.

Although such modifications in the TPE for promoting adhesion are generally known, an improved adhesion to POM is described nowhere, such a positive effect was not to be expected in respect of POM. Rather, it is to be regarded as surprising that this modification brings not only the improvement sought in the composite to styrenic thermoplastics, but also a very good adhesion to POM.

The POM involved according to this invention in the compound belongs to the group of generally known polyoxymethylenes, which are built up either from the homopolymer of formaldehyde or from the copolymer of formaldehyde or its cyclic oligomers and cyclic ethers, cyclic acetals and/or linear acetals, and generally has a melt index (MFR according to ISO 1133) of between 0.5 and 75 g/10 min.

Modified types of POM can advantageously also be used simultaneously for the compound, preferably in mixtures of POM with one or more of the following polymers: urethane thermoplastic elastomer (TPE-U); styrene/butadiene copolymer (SBS); ethylene/vinyl acetate copolymer (EVA); hydrogenated styrene block copolymer based on a hydrogenated poly-isoprene/butadiene rubber (SEEPS); hydrogenated styrene block copolymer based on a hydrogenated poly-isoprene rubber (SEPS); hydrogenated styrene block copolymer based on a hydrogenated poly-butadiene rubber (SEBS); compounds based on a hydrogenated styrene block copolymer, which can be present as hydrogenated poly-isoprene/butadiene rubber or as hydrogenated poly-isoprene rubber (SEPS) or as hydrogenated poly-butadiene rubber (SEBS); olefinic materials, such as polyethylene (PE), polypropylene (PP); polystyrene (PS); acrylonitrile butadiene styrene (ABS); polycarbonate (PC); and styrene acrylonitrile (SAN).

By the choice of mixture components in the POM, the adhesion to the TPE-S can be further optimized according to the composition thereof.

It should be clear that a compound for the preparation of the composite body according to the invention can also additionally comprise other typical additives, in addition to the modifiers mentioned, such as paraffinic plasticizer oil for rubber and additives/stabilizers (e.g., heat stabilizers, antioxidants, anti-aging agents, ozone stabilizers, processing auxiliaries). The compound can furthermore also comprise thermoplastic materials (e.g., olefins, styrenes) and fillers (e.g., calcium carbonate).

The composite body according to the invention may be prepared by a multicomponent injection molding process in a one-stage form (e.g., by the rotary, index plate, slider, transfer, co-injection/sandwich technique) or in a multi-stage form (e.g., insert technique), or by a multicomponent extrusion process (e.g., coextrusion).

Generally, the hard material component (POM) is first injected into the injection mold. Thereafter, in the one-stage process the hard component is moved to the other injection unit by means of the rotary, index plate, slider or transfer technique and the soft component is then injection-molded thereon. The two-stage process in which the hard component which has been injection-molded beforehand is inserted into the mold manually or by means of handling equipment and the soft component is then injection-molded thereon is another possibility. The reverse procedure, in which the hard component is injection-molded onto the soft component, is also possible with the process just described. Bonding of polyoxymethylene with a thermoplastic styrene elastomer in the form of the co-injection/sandwich process is furthermore possible.

EXAMPLES

Various bonding adhesion experiments with products of the prior art in comparison with the composite bodies with a composition according to the invention are described below.

The compound comprises the following contents, based on 100 parts of rubber (styrene block copolymer):

| | |
|---|---|
| Plasticizer oil: | ≧10 parts |
| Filler: | ≧10 parts |
| Thermoplastic: | ≧10 parts |
| Additives: | ≧1 part |

The recipes are compounds according to the invention based on SEEPS, which differ by addition of components which have not yet been used for such a purpose:

1–50 wt. % SBS

1–50 wt. % EVA, such as EVA 28/05 or a combination of the two.

These series of experiments clearly show that the modifications according to the invention to TPE alone already lead to a clear improvement in the bonding to non-modified POM.

As regards the values stated in the table, which relate to the adhesion at the bonding point, it should be noted that these cannot be compared with data determined otherwise, since test methods recognized as standard do not yet exist. A quantitative comparison is therefore possible only internally. The production process moreover has a great influence on the measurement values. This is also clear from the fact that the test specimens produced by the 2K process (table 1) give significantly higher values than the test specimens produced by insert molding. These figures can thus be used only for internal qualitative comparison. The values stated in parentheses thus also cannot be compared directly with those without parentheses.

As is known, the bonding is generally improved if the two materials comprise a common or similar component. However, the problem often lies in an incompatibility of this component with one or other material, with the hardness having a substantial influence on the adhesive bond. To enable the values to be compared, it should be ensured that all the parameters coincide and are optimized.

It has been found that a small addition of SBS or the small addition of a TPE compound, such as Ponaflex S 660AD1, to POM brings a clear improvement to the bond and shows a good compatibility. It has furthermore been found that the addition of EVA to the TPE compound improves the adhesion by up to 20%. In another step, an attempt was made to compound adhesion-improving components both into the TPE and into the POM on a 2-screw extruder. This series of experiments resulted in the modifications listed in the table, as optimum compounds with good adhesion and without a noticeable limitation in the typical properties.

Various experimental bonding adhesion experiments with a TPE, namely SEPS (TPE-1), and POM homopolymer with an MFI=15 (POM-1) in any manner have thus lead to unsatisfactory results; no adhesion at all was achieved between these substances (see table 1).

The same inadequate results were found with the same POM with SEBS (TPE-4) (Shore A hardness=35 to 45) (see table 1).

It was furthermore attempted to bond SEPS (TPE-1) to POM copolymer with an MFI=9 (POM-5). Here also, no adhesion was again observed, regardless of whether the one- or two-stage multicomponent injection molding process was used (see table 1).

A lack of adhesion in the one-stage multicomponent injection molding process was likewise observed when the SEPS of the experiment mentioned last was replaced by SEBS. Only when the more involved two-stage multicomponent injection molding process was employed here was some adhesion with a tear strength value of 0.33 N/mm$^2$.

Surprisingly, it was then found that if adhesion-modified TPEs are employed, an outstanding bonding adhesion to various POMs can be achieved. If the POMs are also adhesion-modified, which is not absolutely essential, however, particularly good results are achieved, as the values listed in this context in table 1 and the combination of substances stated underneath the table show.

This test bar was produced by filling the cavity for the shoulders of the tensile test bar with the harder POM material in a first step. The temperature of the melt is typically 215° C. (205° C. for the copolymer). After the melt has solidified, the mold is opened and rotated, and after closing, in the second step the soft TPE-S material, which has a material temperature of 210° C., is injected into the mold. After solidification of this melt, the composite body can be removed from the mold.

The mold temperature in this experiment is 40° C., but can be varied in order to influence the dimensional accuracy and the ejectability of the parts. All the other process parameters, such as injection pressure, holding pressure, injection speed and holding pressure time, can also be optimized according to the material combination. If the adhesion is adequate, a 2-component tensile test bar which has the material sequence of hard-soft-hard results. This is tested for tensile strength in a standard test machine. The force F (in Newtons) or tension (in MPa) measured is a measure of the adhesion between the two materials.

In the 2-stage process the hard component is first injection-molded. This is inserted into the mold in the cold state in a second step. The soft component is then injection-molded onto the cold inserted part.

If the adhesion between the components is not high enough, the multicomponent part cannot be removed from the mold without being destroyed. In this case, "no adhesion" is stated in the table.

TABLE 1

|  | TPE-1 | TPE-2 | TPE-3 | TPE-4 |
|---|---|---|---|---|
| POM-1 | no adhesion | 1.4 (0.91) | — (0.24) | no adhesion |
| POM-2 | no adhesion | 1.5 (0.91) | (0.60) | — |
| POM-3 | no adhesion | 1.5 (0.91) | (0.71) | (0.44) |
| POM-4 | no adhesion | 1.2 (0) | (0.90) |  |
| POM-5 | no adhesion | — (0.95) |  | no adhesion (0.33) |
| POM-6 |  | 1.5 (0.97) | (0.76) |  |
| POM-7 |  | 0.8 (0.80) | — (0.78) |  |

Table 1: Results for bonding adhesion [N/mm$^2$] of various hard/soft combinations of POM and TPE-S determined on 2-component tensile test bars produced by one-stage multi-component injection molding (values in parenthesis produced by two-stage multicomponent injection molding, insert molding).

POM-1: POM homopolymer with an MFI of 15; no modification

POM-2: POM homopolymer with an MFI=12; modification with 10% partly aromatic polyester TPE-U of 4,4'-methyldiphenyl diisocyanate, 1,4-butanediol and polybutylene adipate (e.g., U.S. Pat. No. 5,286,807 or U.S. Pat. No. 4,804,716)

POM-3: POM homopolymer of MFI=15; modification with 10% styrene/butadiene copolymer POM-4: POM homopolymer of MFI=15; 10% TPE-S compound (Ponaflex S 660 ADI)

POM-5: POM copolymer with an MFI=9; no modification (product of Ticona Hostaform C9021 NC)

POM-6: POM homopolymer of MFI=15; modification with 5% SEEPS and 5% SBS

POM-7: POM homopolymer of MFI=15; modification with 10% ethylene/vinyl acetate (EVA 28/05)

POM-8: POM homopolymer with an MFI=2.1; modification with 15% partly aromatic polyester TPE-U of 4,4'-methyldiphenyl diisocyanate, 1,4-butanediol and polybutylene adipate POM-9: POM homopolymer with an MFI=1.9; modification with 30% partly aromatic polyester TPE-U of 4,4'-methyldiphenyl diisocyanate, 1,4-butanediol and polybutylene adipate POM-10: POM homopolymer of MFI=15; modification with 1% styrene/butadiene copolymer POM-11: POM homopolymer of MFI=15; modification with 1% ethylene/vinyl acetate (EVA 28/05)

POM-12: POM homopolymer of MFI=15; modification with 10% SEEPS

POM-13: POM homopolymer of MFI=15; 5% TPE-S compound (Ponaflex S 660 ADI)+5% SEEPS POM-14: POM homopolymer of MFI=15; modification with 5% ethylene/vinyl acetate (EVA 28/05)+5% SEEPS POM-15: POM homopolymer of MFI=15; modification with 1% SEEPS TPE-1: SEPS compound: no modification, Shore A=60 (Ponaflex S 67660 B-LOH-G)

TPE-2: SEPS compound: modification with SBS Shore A=50 (Ponaflex S 650 A)

TPE-3: SEPS compound: modification with EVA Shore A=60 (Ponaflex S 660 AD1)

TPE-4: SEBS compound from Kraiburg TC4 HAZ Shore A=35–45

A table 2 with various bonding experiments is furthermore also given. This table 2 shows by way of extract the results of a more comprehensive series of experiments. From these, the TPE types S 650 A (a), S 660 AD (b) and S 260 AD (c) proved to be particularly suitable. The other types either show no adequate adhesion, or do not fulfill the properties sought.

TABLE 2

| Recipe | S 660 AD1 natural | S 6(6)50 A natural | S 660AD2 natural | S 260 AD natural |
|---|---|---|---|---|
| Recipe composition | TPE-S compound with 10% EVA as an adhesion modifier | TPE-S compound with 25% styrene block copolymer as an adhesion modifier | TPE-S compound with 20% EVA as an adhesion modifier | TPE-S compound with 20% EVA and 20% SBS as adhesion modifiers |
|  | Adhesive strength to POM formaldehyde homopolymer | | | |
| POM-1 | 0.24 | 0.8 | 0.56 | 0.70 |
| POM-2 | 0.6 | 0.75 | 0.55 | 0.74 |
| POM-8 |  | 0.8 | 0.61 | 0.75 |
| POM-9 |  | 0.9 | 0.67 | 0.68 |
| POM-10 | 0.44 | 0.85 | 0.60 | 0.67 |
| POM-15 | 0.46 | 0.86 | 0.56 | 0.69 |
| POM-11 | 0.37 | 0.79 | 0.59 | 0.68 |
| POM-3 | 0.71 | 0.96 | 0.79 | 0.73 |
| POM-12 | 0.68 | 0.86 | 0.65 | 0.80 |
| POM-13 | 0.63 | 0.79 | 0.77 | 0.82 |
| POM-14 | 0.71 | 0.86 | 0.77 | 0.88 |
| POM-6 | 0.66 | 0.96 | 0.73 | 0.83 |

The following substances were investigated for modification of POM:

TPU 1–40 wt. %

Styrene block copolymer (SBS, SEBS, SEPS or SEEPS) 1–40 wt. %

EVA 1–40 wt. %

TPE compound (e.g., Ponaflex S 67960M) 1–40 wt. %

Hydrogenated styrene block copolymer 1–40 wt. %

We claim:

1. A compound for a composite body, comprising:
   a hard component (a) of a polyoxymethylene; and
   a soft component (b) of one or more hydrogenated styrene block copolymers, molded directly onto component (a), the styrene block copolymers being from the group of poly-isoprene/butadiene polymer (SEEPS), poly-isoprene polymer (SEPS), poly-butadiene polymer (SEBS), and combinations thereof;
   wherein the styrene block copolymer is adhesion-modified by the addition of a compound selected from styrene/butadiene copolymer (SBS), ethylene/vinyl acetate copolymer (EVA), olefinic polymers, polystyrene (PS), and combinations thereof.

2. The compound according to claim 1 wherein said olefinic polymers are from the group of polyethylene and polypropylene.

3. The compound according to claim 1, wherein one or more of the following substances are added as modifiers of the polyoxymethylene: SBS; EVA; hydrogenated styrene block copolymer based on a hydrogenated poly-isoprene/butadiene rubber (SEEPS), hydrogenated styrene block copolymer based on a hydrogenated poly-isoprene rubber (SEPS), hydrogenated styrene block copolymer based on a hydrogenated poly-butadiene rubber (SEBS), compounds based on a hydrogenated styrene block copolymer which can be present as hydrogenated poly-isoprene/butadiene rubber (SEEPS) or as hydrogenated poly-isoprene rubber (SEPS) or as hydrogenated poly-butadiene rubber (SEBS), olefinic polymers; polystyrene; acrylonitrile butadiene styrene (ABS); polycarbonate (PC); styrene acrylonitrile (SAN); and urethane thermoplastic elastomer (TPE-U).

4. The compound according to claim 3 wherein said olefinic polymers are from the group of polyethylene and polypropylene.

5. The compound according to claim 3, wherein polyoxymethylene is built up from a formaldehyde homopolymer or formaldehyde copolymer or its cyclic oligomers and cyclic ethers, cyclic acetals and/or linear acetals.

6. The compound according to claim 5, wherein the polyoxymethylene has a melt index (MFR according to ISO 1133) of between 0.5 and 75 g/10 min.

7. The compound according to claim 1, wherein the modifiers of the styrene block copolymers are added in a weight range from 5 to 25 wt. %, based on the the styrene block copolymers.

8. The compound according to claim 2, wherein the modifiers of the styrene block copolymers are added in a weight range from 5 to 25 wt. %, based on the the styrene block copolymers.

9. The compound according to claim 2, wherein the modifiers of the polyoxymethylene are added in a weight range from 5 to 25 wt. %, based on the the polyoxymethylene.

10. A composite body produced from a compound according to claim 1.

11. A composite body produced from a compound according to claim 2.

12. A process for the production of the composite body according to claim 1 by a multicomponent injection molding process.

13. The process for the production of the composite body according to claim 12, wherein the multicomponent injection molding process is conducted in a one-stage form, by a rotary, index plate, slider, transfer or co-injection/sandwich technique.

14. The process for the production of the composite body according to claim 12, wherein the multicomponent injection molding process is conducted in a multi-stage form by an insert process or by a multicomponent extrusion process.

15. The process of claim 14, wherein the multicomponent extrusion process is a coextrusion process.

16. The compound according to claim 1 wherein the hydrogenated styrene block copolymer molded directly onto component (a) is poly-isoprene polymer (SEPS) that is adhesion-modified by the addition of a compound selected from styrene/butadiene copolymer (SBS), ethylene/vinyl acetate copolymer (EVA), olefinic polymers, polystyrene (PS), and combinations thereof.

17. The compound according to claim 16 wherein the SEPS is adhesion-modified by the addition of styrene/butadiene copolymer (SBS), ethylene/vinyl acetate copolymer (EVA), or a combination thereof.

* * * * *